April 12, 1927.
A. NOVICK
LIQUID LEVEL GAUGE
Filed April 17, 1925
1,624,359
2 Sheets-Sheet 2
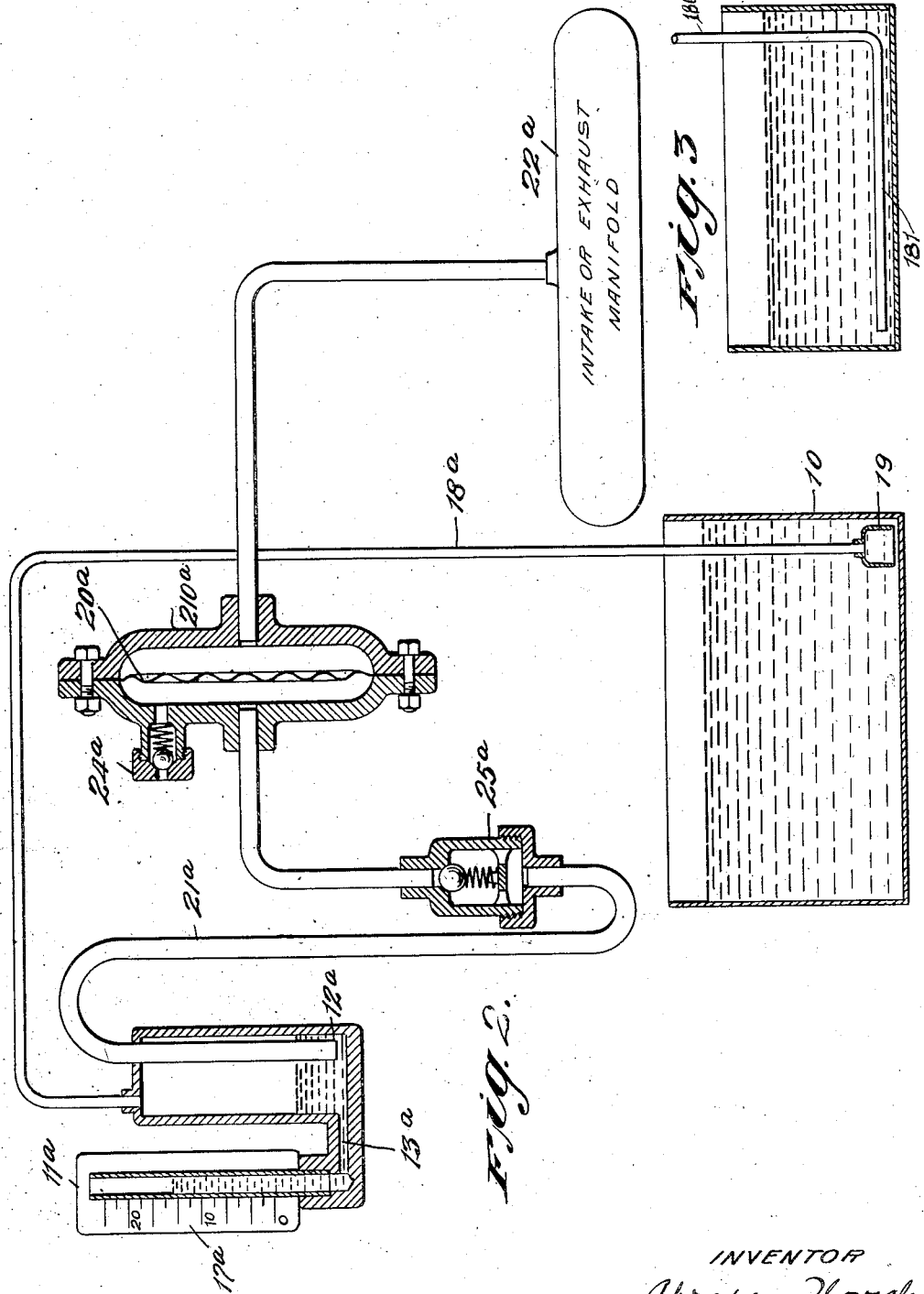
INVENTOR
Abraham Novick
BY Moses & Nolte
ATTORNEYS Patented Apr. 12, 1927.

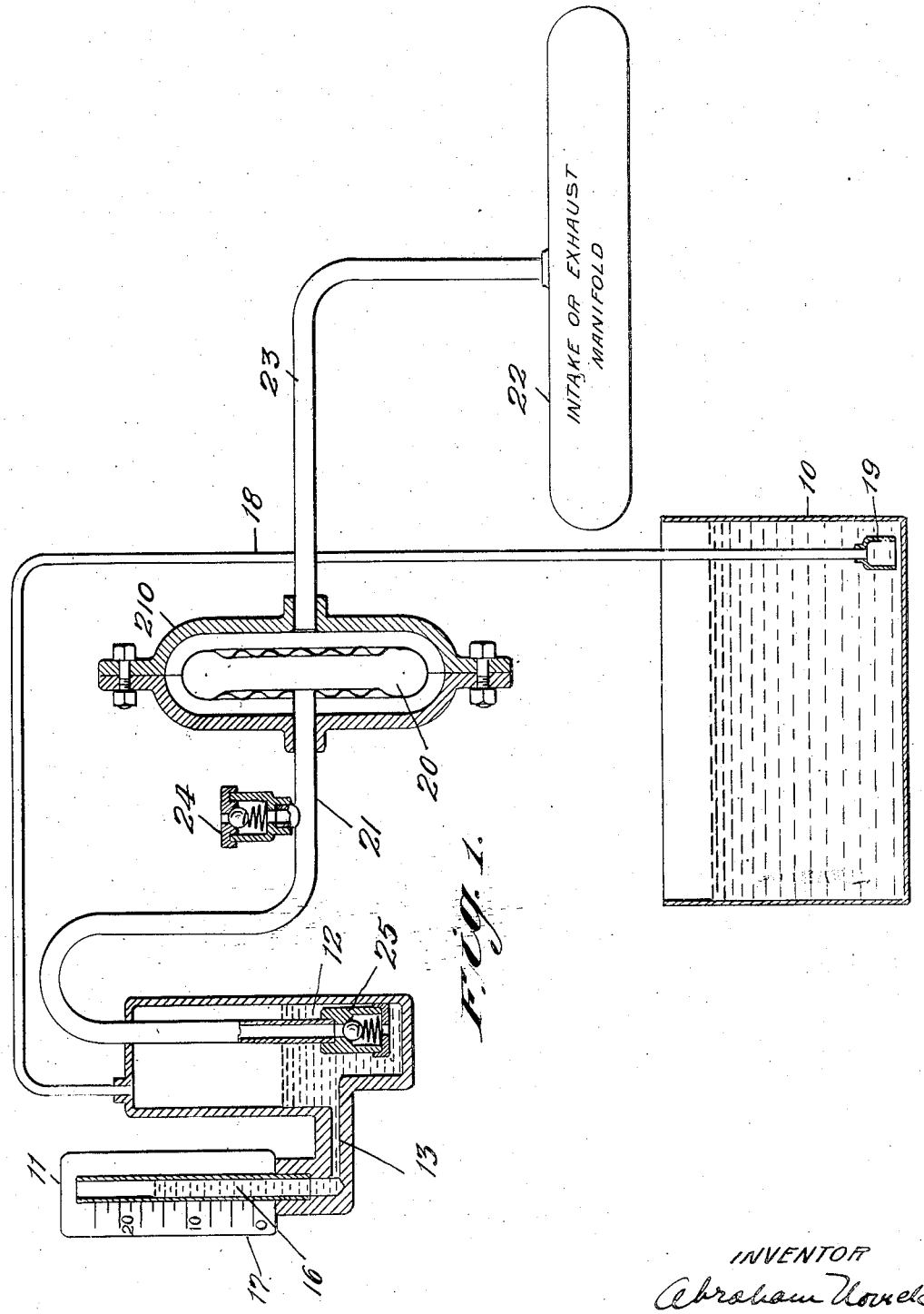

1,624,359

UNITED STATES PATENT OFFICE.

ABRAHAM NOVICK, OF FLUSHING, NEW YORK, ASSIGNOR TO F. L. SMITHE MACHINE CO., INC., OF NEW YORK, N. Y., A CORPORATION OF NEW YORK.

LIQUID-LEVEL GAUGE.

Application filed April 17, 1925. Serial No. 23,796.

In my co-pending applications, Serial Nos. 13,164 and 13,165, filed March 5, 1925, I have described liquid level gauges of the type in which a submerged conduit is used, the pressure of air in which varies according to the liquid level. In such pending application I have also described and claimed a device for automatically introducing air into such conduit for the purpose of maintaining the conduit free from liquid, and thus at all times insuring accuracy of the gauge.

My present invention relates to improvements in said device for automatically introducing air into the conduit, the pressure of air in which is to be indicated. More particularly, my present invention relates to improving the efficiency of the device and to providing better sealing action between such device and the recording instrument.

Certain features disclosed, but not claimed herein, are claimed in my pending application Serial No. 13,165, filed March 5, 1925, entitled "Liquid-level gauges".

My invention will be best understood from the following detailed description taken with the annexed drawings in which:

Figure 1 is a diagrammatic view partly in section illustrating one embodiment of the invention, while Figure 2 is a similar view of a slightly modified form, and Figure 3 is a view of a modified form of pressure conduit terminal.

Referring to the drawings by characters of reference, 10 denotes a tank, the liquid level in which it is desired to record while 11 is an indicating instrument responsive to pressure, the form shown being a liquid manometer of the type ordinarily employed in gauges of the character. As shown, it comprises a reservoir or leg 12 communicating through a restricted passage 13 with a transparent tube 6 having a scale 17 which for convenience may be calibrated in gallons.

A conduit 18 transmits to indicating instrument 11 the pressure caused by the height of liquid on the opening 19 thereof disposed immediately above the bottom of tank 10. As shown, opening 19 may be flared or expanded, whereby, as is well known in the art, variations in the height of liquid in conduit, caused by varying depths of liquid in the tank and by escape of air from the conduit due to leaks and other causes, are minimized.

As in my above mentioned application, Serial #13,165 I provide means for automatically introducing air in small quantities into conduit 18 by utilizing variations in pressure occurring in an appropriate region of the internal combustion engine used in connection with my improved gauge, as for example, the intake or exhaust manifold of the engine. As in the preceding instance mentioned, I provide means for utilizing this variation of pressure consisting of a casing in which is located diaphragm means movable in response to such pressure variation. This movement of the diaphragm is then caused by appropriate valves to act as a pump for introducing air into the conduit 18. I have discovered, however, that better pumping efficiency will be had if the region on the conduit side of the diaphragm be made as small as possible, whereby it will have a very small minimum volume, or in other words if the so-called "dead air" space be a minimum.

In Fig. 1, I have shown one improved means of accomplishing such result, while at the same time improving the pumping efficiency of the device. The means which I have shown consists of a diaphragm box 20 which is interiorly connected by means of a tube 21 which preferably terminates below the working level of the liquid in reservoir 12 of the manometer. Enclosing diaphragm box 20 is a casing 210. the walls of which are spaced from box 20. Casing 210 is joined to intake or exhaust manifold 22 by means of a pipe or tube 23. Tube 21 is provided at a suitable point in its length with an air admission valve 24. Thus a sudden decrease in the pressure occurring in manifold 22 (as is of frequent occurrence in the operation of an automobile) will cause the diaphragm box 20 to expand owing to its spring action whereby air will be drawn in through valve 24. When now the pressure in manifold 22 is increased, the diaphragm box 20 is contracted, thereby forcing air through tube 21 into the reservoir 12, and thence into conduit 18. By such construction, the minimum volume of the box may be made very small, due to the larger surface acted upon by the external pressure.

It is essential that the air above the liquid level in reservoir 12 be effectively sealed against escape into the tube 21 as such an event would impair the accuracy of the reading of the gauge 11. I therefore bring the end of tube 21 beneath the working level of liquid in reservoir 12 as has been previously mentioned, whereby an effective seal is maintained against such escape of air. To further insure against such escape I have in the arrangement shown in Fig. 1 provided a submerged non-return valve 25 which acts to prevent the return of liquid in reservoir 12. Thus by sealing tube 21 against the liquid, I achieve an excellent sealing action against the air, particularly since it is easier to provide against the return of a liquid through the tube than it is of air.

It will thus be seen that I am able to provide such a seal by utilizing the liquid forming a part of the gauge itself, but it will be understood that a separate liquid seal may be provided in case a gauge of a different type be used.

In Fig. 2 I have shown a slightly modified form in which the valve 25ª is not submerged but is located without the reservoir 12ª. Should the liquid in reservoir 12ª be forced into tube 21ª, valve 25ª will function to stop its flow. In the arrangement Fig. 2 I have also made use of the principle of having a minimum dead air space between the diaphragm and the pressure conduit, as shown a single diaphragm 20ª is used, being held within a casing 210ª which is only very slightly spaced from diaphragm 20ª particularly on the side of tube 21ª.

In Fig. 3 I have shown the pressure conduit 180 terminating in a horizontally extending position 181. This has the advantage that a reserve supply of air is provided to insure against absorption and leakage when the automobile is not running, as liquid may fill the entire portion 181 before an error is introduced which will affect the gauge. Thus after the automobile has stood over night, for example, the gauge will give a true reading when starting.

It will thus be seen that I have provided a device of high efficiency for automatically supplying air to the pressure responsive conduit of a gauge of the character described, and that furthermore I have made use of a liquid seal for preventing the return of the air from the conduit making use of a non-return valve which shall be actuated by liquid rather than by air, whereby a more positive sealing action is had.

It will be understood that the arrangements shown are illustrative only and thus many changes may be made in the construction without departing from the spirit of my invention or the scope of the claims.

What I claim is:

1. In a device for indicating the depth of liquid in a tank, a conduit extending into the tank and having an opening communicating with the liquid therein so as to be subjected to the head of liquid on said opening, indicating means connected to be responsive to the pressure in the conduit, means for automatically introducing air into said conduit, comprising an operative connection between a source of air under pressure and said conduit, a non-return valve in said connection, and means constituting a chamber containing liquid in which said non-return valve is submerged.

2. In a device for indicating the depth of liquid in a tank, a conduit extending into the tank and having an opening communicating with the liquid therein so as to be subject to the head of liquid on said opening, a manometer connected for indicating pressure in said conduit, means for automatically introducing air into said conduit comprising a tube connecting a source of air under pressure and said conduit, said tube terminating beneath the working level of liquid in said manometer, and a valve submerged in said liquid for preventing the return of air from the manometer to the tube.

3. The device for use in connection with an internal combustion engine as described in claim 1 in which the automatic means for introducing air into the conduit comprises a pumping member, and means for actuating said member by the changes in pressure in a manifold of the engine.

4. The device for use in connection with an internal combustion engine as described in claim 2, in which automatic means for introducing air into the conduit comprises a pumping member, and means for actuating said member by the changes in pressure in a manifold of the engine.

5. The device for use in connection with an internal combustion engine as described in claim 2, in which the automatic means for introducing air into the conduit comprises a diaphragm box and means for actuating said diaphragm box by the changes in pressure in a manifold of the engine, said diaphragm box being of comparatively small minimum volume whereby changes in volume of said box will produce comparatively large increments of air added to said conduit.

6. The device for use in connection with an internal combustion engine as described in claim 2, in which the automatic means for introducing air into the conduit comprises a diaphragm box and means for actuating said diaphragm box by the changes in pressure in a manifold of the engine, the interior of the diaphragm box being connected to said conduit.

7. In a device for indicating the depth of liquid in a tank, a conduit extending into the tank and having an opening communicating with the liquid therein so as to be subject to the head of liquid on said opening, a source of variable pressure, indicating means connected to be responsive to the pressure in the conduit, and means for automatically introducing air into said conduit, comprising a deformable closed box in communication with the conduit, and a casing surrounding the deformable box, and having a chamber communicating with the source of variable pressure.

8. In a device for indicating the depth of liquid in a tank, a conduit extending into the tank, and having an opening communicating with the liquid therein so as to be subject to the head of liquid on said opening, indicating means connected to be responsive to the pressure in the conduit, and means for automatically introducing air into said conduit, comprising a pressure chamber, and a deformable box housed in the pressure chamber and communicating with the conduit, said chamber being subject to variations in pressure.

9. In a device for indicating the depth of liquid in a tank, a conduit extending into the tank and having an opening communicating with the liquid therein so as to be subject to the head of liquid on said opening, manometer indicating means comprising a gauge liquid, said means being connected to be responsive to the pressure in the conduit, means for introducing air into said conduit, comprising a tube extending into the gauge liquid whereby the air is caused to be introduced into the conduit through the gauge liquid, and a non-return valve in said tube below the level of the gauge liquid.

10. In a device for indicating the depth of liquid in a tank, a conduit extending into the tank and having an opening communicating with the liquid therein so as to be subject to the head of liquid on said opening, a source of variable pressure, indicating means connected to be responsive to the pressure in the conduit, and means for automatically introducing air into said conduit comprising a thin, wafer-like box in communication with the conduit, the sides of said box being formed of thin, metallic plates so as to render the box deformable in response to variations in pressure, and a casing surrounding the said box, and means connecting the interior of said casing with the source of variable pressure.

In testimony whereof I have affixed my signature to this specification.

ABRAHAM NOVICK.